US006954507B2

(12) United States Patent
Bohnhoff et al.

(10) Patent No.: US 6,954,507 B2
(45) Date of Patent: Oct. 11, 2005

(54) METHOD FOR ESTIMATING THE BIT ERROR RATE IN A RADIO RECEIVER AND CORRESPONDING RADIO RECEIVER

(75) Inventors: Peter Bohnhoff, München (DE); Ralf Hartmann, München (DE)

(73) Assignee: Infineon Technologies AG, Munich (DE)

( * ) Notice: Subject to any disclaimer, the term of this patent is extended or adjusted under 35 U.S.C. 154(b) by 398 days.

(21) Appl. No.: 10/095,312

(22) Filed: Mar. 11, 2002

(65) Prior Publication Data

US 2002/0181621 A1 Dec. 5, 2002

Related U.S. Application Data

(63) Continuation of application No. PCT/EP00/08702, filed on Sep. 6, 2000.

(30) Foreign Application Priority Data

Sep. 10, 1999 (DE) .......................................... 199 43 386

(51) Int. Cl.[7] ................................................. H03D 1/00
(52) U.S. Cl. ...................................................... 375/341
(58) Field of Search ................................. 375/316, 346, 375/341

(56) References Cited

U.S. PATENT DOCUMENTS 5,119,400 A * 6/1992 Koch .......................... 375/230
5,684,836 A * 11/1997 Nagayasu et al. ............ 375/326

FOREIGN PATENT DOCUMENTS

DE 39 10 739 C3 10/1990
WO WO 98/07240 2/1998

OTHER PUBLICATIONS

"Optimum and Sub–Optimum Detection of Coded Data Disturbed by Time–Varying Intersymbol Interference", Wolfgang Koch and Alfred Baier, 1990 IEEE, 1679–1684.*
John G. Proakis: "Digital Communications", *McGraw Hill*, Boston, 4th ed., Aug. 2000, pp. 247–251, 482–485, 604–607, and 680–682.
Wolfgang Koch et al.: "Optimum And Sub–Optimum Detection of Coded Data Disturbed By Time–Varying Intersymbol Interference", Globecom '90, IEEE Global Telecommunications Conference & Exhibition, San Diego, Ca, Dec. 2–5, 1990, pp. 1679–1684.
Kazuyuki Kaneda et al.: "Multilevel Coding for Impulsive Noise", and English translation of relevant parts, *Technical Report*, vol. 90, No. 126, Jul. 14, 1990, pp. 35–40, The Institute of Electronics, Information and Communication Engineers, Japan.
Masato Tajima et al.: "Bidirectional Viterbi Decoding Algorithm With Soft–Outputs", and English translation of relevant parts, *Technical Report of IEICE*, IT96–80, Mar. 1997, pp. 115–120, The Institute of Electronics, Information and Communication Engineers, Japan.

* cited by examiner

*Primary Examiner*—Kevin Burd
(74) *Attorney, Agent, or Firm*—Laurence A. Greenberg; Werner H. Stemer; Ralph E. Locher (57) ABSTRACT

In a radio receiver, an equalizer generates reliability information in the form of soft decision information indicating probabilities that a data symbol received by the radio receiver is based on a specific transmitted value. A bit error rate estimator obtains bit error rate information regarding the bit error rate of the received signal, corresponding to the received data symbols, by evaluating the reliability information.

12 Claims, 3 Drawing Sheets

METHOD FOR ESTIMATING THE BIT ERROR RATE IN A RADIO RECEIVER AND CORRESPONDING RADIO RECEIVER

CROSS-REFERENCE TO RELATED APPLICATION

This application is a continuation of copending International Application No. PCT/EP00/08702, filed Sep. 6, 2000, which designated the United States.

BACKGROUND OF THE INVENTION

FIELD OF THE INVENTION

The present invention relates to a method for estimating the bit error rate in a radio receiver and to a corresponding radio receiver, in particular a mobile radio receiver.

Transmission channels in mobile radio systems are characterized by their time-dependent multipath reception, which leads to intersymbol interference in digital transmission systems. In order to be able to deal with such intersymbol interference, the received data have to be equalized at the receiving end. At the transmitter in a cellular network, because of the rapidly changing transmission conditions and also in order to suppress adjacent-channel and common-channel interference, the data that are intended to be transmitted are generally transmitted in an interleaved and a channel-coded manner (for example in voice transmissions in accordance with the GSM (Global System for Mobile Communications) mobile radio standard). In the receiver, the reception data are then correspondingly decoded after equalization.

Figure 4:
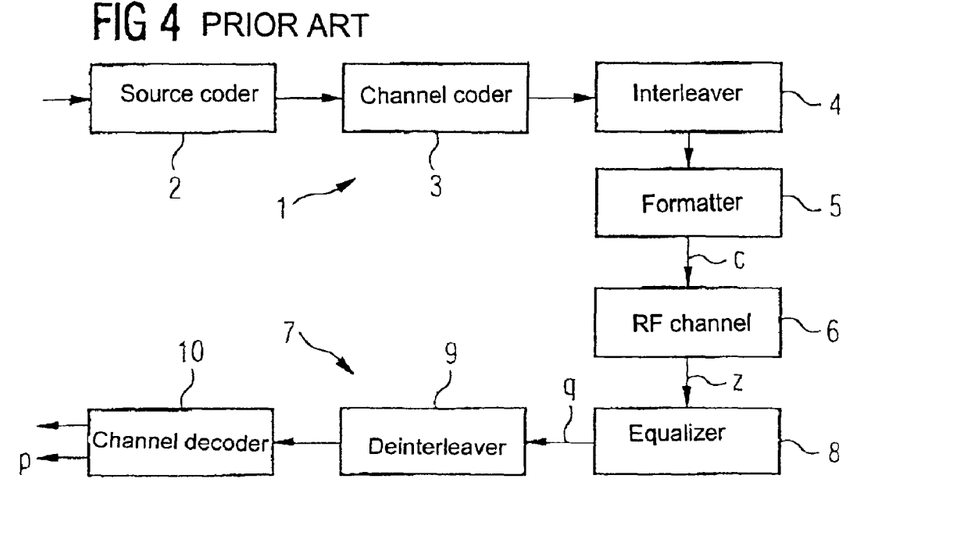
FIG. 4 is a simple block diagram of a mobile radio transmission model having a prior art mobile radio receiver.

FIG. 4 illustrates an exemplary transmission model of a mobile radio system of this type in which, a mobile radio transmitter 1 and a mobile radio receiver 7 communicate with one another via a channel 6.

In the transmitter 1, information that will be transmitted, for example voice information, is first converted into a digital signal, i.e. into a sequence of binary symbols, by a source coder 2 and is output in the form of source-coded data words or data vectors. A channel coder 3 maps each data word into a code word whose symbols are permuted, i.e. interleaved, by an interleaver 4. Ideally, the interleaving is effected in such a way that any two symbols of a code word are mapped onto two different output words of the interleaver 4. Finally, the formatter 5 adds a specific number of known symbols (so-called tail symbols) at the beginning and end of each data word of the interleaver 4 and outputs transmission data words or transmission vectors $\underline{c}$ which are transmitted to the receiver 7 via the radiofrequency channel 6. The channel 6 shown in FIG. 1 includes, inter alia, the modulator and amplifier of the transmitter 1, the actual RF channel (transmission channel) and also the receiver input stage, the input filter and the A/D converter of the receiver 7.

In the receiver 7, the equalizer 8, the deinterleaver 9 and the channel decoder 10 jointly have the task of determining the original transmission sequence $\underline{c}$ with the greatest possible reliability using the reception sequence $\underline{z}$. To that end, using so-called soft decision, reliability information q is generated for the channel decoder 10. The reliability information q indicating, for each received symbol, the a priori probability that the received symbol is based, for example, on a transmitted '−1' or '+1'. In order to generate the reliability information, the channel 6 is modeled and the resultant channel model is represented by a corresponding trellis diagram that describes the behavior of the channel in the form of state transitions. By applying the so-called Viterbi algorithm, using the trellis diagram, it is then possible to determine the abovementioned reliability information q in the form of probability indications. For further details on the determination of the reliability information using the Viterbi algorithm, reference is made to "Digital Communications", Proakis, J. G., McGraw-Hill, New York, 1983, or "Optimum And Sub-Optimum Detection of Coded Data Disturbed by Time-Varying Intersymbol Interference", Wolfgang Koch and Aldred Baier, 1990 IEEE.

In addition to a higher transmission reliability, the transmission of channel-coded data also has the advantage that information p regarding the bit error rate (BER) can also be obtained using the channel decoding. Thus, by way of example, when using convolution codes during decoding, the number of errors corrected by the decoding can easily be determined, thereby enabling the bit error rate to be adequately estimated.

However, mobile radio systems are also known in which the data are transmitted in uncoded form and, consequently, the channel coder 3 and channel decoder 10 shown in FIG. 4 are omitted (for example in GPRS (General Packet Radio Services) systems). The bit error rate thus has to be estimated in a different way in such cases.

International Publication WO 98/07240 A1 discloses a method for estimating the connection quality between a radio transmitter and a radio receiver. This method is based on a Viterbi algorithm. To that end, two so-called transition values are calculated for each point of a trellis diagram. The transition values correspond to the logarithm of the probability for a transition into this point. The maximum for the two transition values and also the difference between the two maxima are determined in each column of the trellis diagram. The connection quality in the radio system including the transmitter and the receiver is inferred from the difference value.

U.S. Pat. No. 5,119,400 A describes another method for estimating the connection quality between a radio transmitter and a radio receiver. This method includes generating reliability information using an equalizer that is integrated into the radio receiver. The reliability information indicates the probability with which the data received by the radio receiver correspond to the data transmitted by the radio transmitter.

SUMMARY OF THE INVENTION

It is accordingly an object of the invention to provide a method for estimating the bit error rate in a radio receiver and also a corresponding radio receiver, whereby the bit error rate can be reliably estimated, in particular, also in the case of uncoded transmission of the data.

With the foregoing and other objects in view there is provided, in accordance with the invention, a method for estimating the bit error rate in a radio receiver, which includes the steps of: with an equalizer in a radio receiver, generating reliability information indicating probabilities that a data symbol received by the radio receiver via a radio channel is based on a specific transmitted value; generating the reliability information as soft decision information; with a bit error rate estimator, evaluating the reliability information to obtain bit error rate information regarding a bit error rate of a received signal corresponding to received data symbols; and quantizing the soft decision information into K quantization levels, determining a symbol error rate information item for a corresponding quantization level of each quantized soft decision information item, and dependent thereon, calculating the bit error rate information p for a complete burst in accordance with the formula:

$$p = \frac{\sum_{k=0}^{K-1} n_k p_k}{\sum_{k=0}^{K-1} n_k}$$

where K denotes a number of the quantization levels, $n_k$ denotes a number of estimated symbols in a quantization level k, and $p_k$ denotes a symbol error rate of the quantization level k.

In accordance with an added feature of the invention, the symbol error rate $p_k$ Of the quantization level k from quantized soft decision information $q_k$ of the quantization level k is calculated using the formula:

$$p_k = \frac{1}{1 + \exp(q_k)}$$

In accordance with an additional feature of the invention, the soft decision information q is determined by using the formula:

$$q = \ln\frac{P1}{P2}$$

where P1 indicates a probability that a received data symbol is based on a first transmitted value, and P2 indicates a probability that a received data symbol is based on a second transmitted value. The probability P1 is approximated by a path metric of a first path of a trellis diagram that describes the radio channel. The first path is the path of the trellis diagram that has the first transmitted value with the best path metric at a specific instant. The probability P2 is approximated by a path metric of a second path of the trellis diagram. The second path is the path of the trellis diagram that has the second transmitted value with the best path metric at the specific instant. In accordance with another feature of the invention, ln(P1) is approximated by MOP/$2\sigma^2$ and ln(P2) is approximated by MZP/$2\sigma^2$. MOP denotes the path metric of the first path of the trellis diagram, MZP denotes the path metric of the second path of the trellis diagram, and $\sigma^2$ denotes the noise power that is superposed on the received signal along the radio channel.

In accordance with a further feature of the invention, the soft decision information q is approximated using the formula:

$$q = C\frac{MOP - MZP}{2\sigma^2}$$

where C represents a scaling constant; and the soft decision information q is subsequently quantized into the K quantization levels.

With the foregoing and other objects in view there is provided, in accordance with the invention, a radio receiver, that includes an equalizer for equalizing a radio signal that is received via a radio channel and for generating reliability information indicating probabilities that a received data symbol is based on a specific transmitted value. The radio receiver also includes a bit error rate estimator for evaluating the reliability information supplied by the equalizer to obtain bit error rate information p regarding a bit error rate of a received signal corresponding to received data symbols. The equalizer generates the reliability information as soft decision information. The bit error rate estimator quantizes the soft decision information into a plurality of quantization levels, determines a symbol error rate information item for a corresponding quantization level from each quantized soft decision information item, and in a manner dependent thereon, calculates the bit error rate information p for a complete burst in accordance with the formula:

$$p = \frac{\sum_{k=0}^{K-1} n_k p_k}{\sum_{k=0}^{K-1} n_k}$$

where K denotes a number of the quantization levels, $n_k$ denotes a number of estimated symbols in a quantization level k, and $p_k$ denotes a symbol error rate of the quantization level k.

In accordance with an added feature of the invention, the bit error rate estimator is connected between the equalizer and a deinterleaver.

According to the invention, information regarding the bit error rate of the reception signal is derived from the reliability information that is present and that is generated in the radio receiver anyway, in particular, the reliability information is in the form of so-called soft decision information. Consequently, the bit error rate corresponding to a complete burst can be calculated in a relatively simple manner in the receiver.

A simplification and hence a reduction in outlay can be achieved if the reliability information is approximated by path metrics of the best '+1' path and of the best '−1' or '0' path of a trellis diagram that describes the respective radio channel.

The present invention is suitable, in particular, for bit error rate estimation in mobile radio systems, for example GSM mobile radio systems, and can also be applied to multivalue symbol alphabets such as those that are provided, for example, in EGPRS (Enhanced General Packet Radio Services) systems in accordance with the GSM development EDGE.

Other features which are considered as characteristic for the invention are set forth in the appended claims.

Although the invention is illustrated and described herein as embodied in a method for estimating the bit error rate in a radio receiver and corresponding radio receiver, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The present invention is based on the assumption that, in the receiver, the reception signal is equalized using an equalizer, as has been already explained with reference to FIG. 4. The equalizer outputs reliability information in the form of so-called soft decision information regarding the equalization it has carried out. The basic principles for obtaining the reliability information will be explained briefly below, insofar as they are necessary for understanding the invention.

As has already been mentioned, the reliability information is information obtained through a certain so-called soft decision. In contrast to a hard decision, in which only one fixed decision threshold is used, in a soft decision, a multiplicity of decision thresholds are used, and consequently, the decision reliability is significantly increased. Therefore, equalizers that are used, for example, in GSM receivers and that are also provided in accordance with the future extension of the GSM mobile radio standard, EDGE, must, on the one hand, adequately equalize the reception signal, and on the other hand, provide the reliability information described above.

In order to derive and explain the principle on which the present invention is based, reference is made below to the document (already mentioned) "Optimum And Sub-Optimum Detection Of Coded Data Disturbed By Time-Varying Intersymbol Interference", Wolfgang Koch and Alfred Baier, 1990 IEEE, and in particular, to the transmission model shown in FIG. 1 herein.

Figure 1:
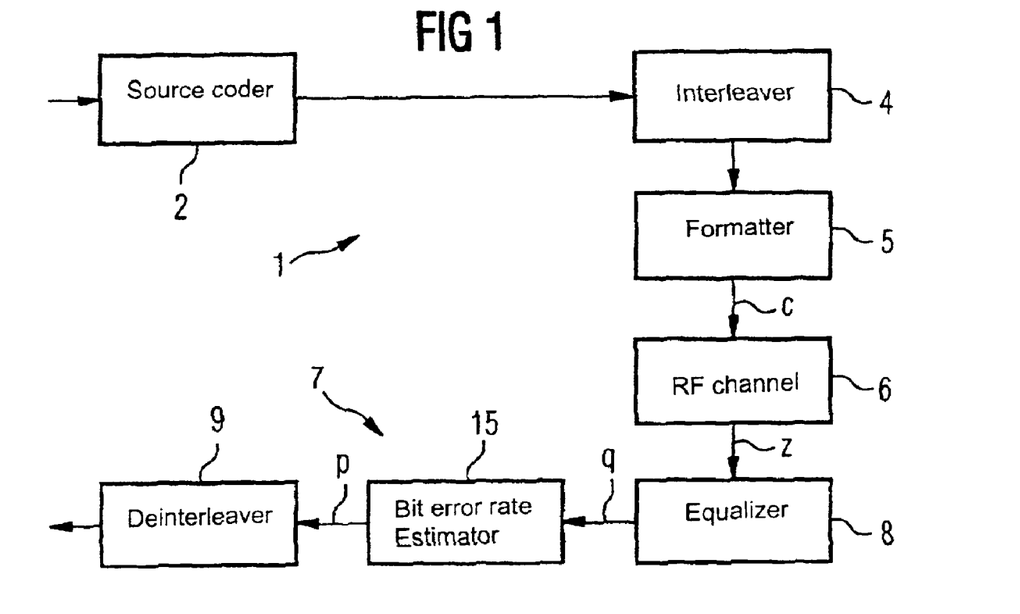
FIG. 1 is a simple block diagram of a mobile radio transmission model having an inventive mobile radio receiver.

Referring now to the figures of the drawing in detail and first, particularly, to FIG. 1 thereof, there is shown an inventive mobile radio system having a mobile radio transmitter 1 and a mobile radio receiver 7 that communicate with one another via a channel 6. In contrast to FIG. 4, no channel coding and channel decoding is provided in the mobile radio system shown in FIG. 1.

As has already been explained, in the transmitter 1, the information that will be transmitted is converted into a digital data word by a source coder 2 and is permuted, i.e. interleaved, by an interleaver 4. A formatter 5 adds J known symbols (so-called tail symbols) at the beginning and at the end of each data word of the interleaver 4, in order to prescribe a defined start and end state of the model of the channel that will be explained in more detail below. The formatter 5 thus outputs transmission words or transmission vectors $\underline{c}$, where $\underline{c}=(C_{1-J}, \ldots, c1, c2, \ldots, C_M)$ and $M=I+J$ where I denotes the length of the data words output by the interleaver 4.

Figure 2:
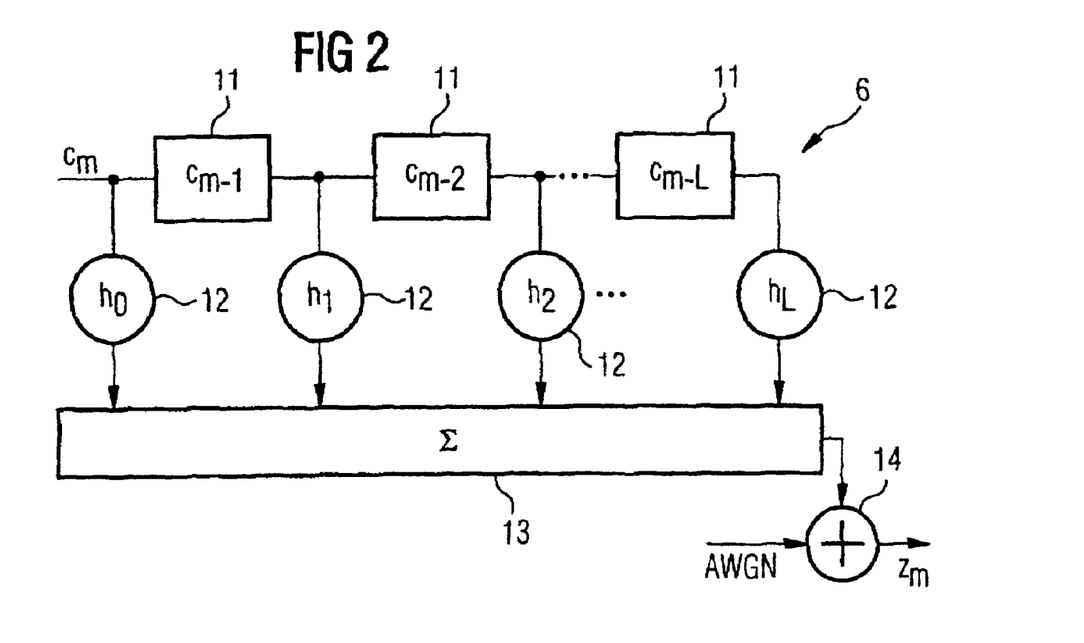
FIG. 2 is a model of the channel of the mobile radio system shown in FIG. 1.

The channel 6 shown in FIG. 1, which includes, inter alia, the modulator and amplifier of the transmitter, the actual RF channel (transmission channel) and also the receiver input stage, the input filter and the A/D converter of the receiver, can be represented by the channel model shown in FIG. 2. The channel model corresponds to a state machine with L storage stages, whose individual buffer-stored transmission symbols $c_m \ldots c_{m-L}$ are acted upon by the multipliers 12 and are then added using an adder 13. The coefficients $h_0 \ldots h_L$ correspond to the coefficients of the channel impulse response. The model also takes account of the noise occurring in the transmission channel that is in the form of additive white Gaussian noise (AWGN) with the power $\sigma^2$. This white Gaussian noise (AWGN) is superposed on the output signal of the adder 13 using an adder 14 so that, finally, a reception symbol $z_m$ of the receiver is obtained.

In the receiver 7, the equalizer 8 has, inter alia, the task of determining the original transmission sequence $\underline{c}$ with the greatest possible reliability using the (distorted) reception sequence $\underline{z}$. To that end, reliability information q is generated using a soft decision, the information indicating, for each received symbol, the a priori probability that the received symbol is based on a transmitted "+1" or "−1".

An optimal MAP equalizer ("Maximum A-Priori Probability") supplies, as soft decision information for each (two-valued) transmission symbol $c_n$, the value $$q(c_n) = \ln \frac{P\{z_n | c_n = +1\}}{P\{z_n | c_n = -1\}} \qquad (1)$$

If a higher-valued symbol alphabet with $$c_n=(c_{n,1}, \ldots, c_{n,m}) \qquad (2)$$

and $$c_{n,i} \in \{+1, -1\} \qquad (3)$$

is assumed, the soft decision information can be calculated separately for each bit:

$$q(c_{n,i}) = \ln \frac{P\{z_n | c_{n,i} = +1\}}{P\{z_n | c_{n,i} = -1\}} \qquad (4)$$

A higher-valued symbol alphabet is used e.g. in the GSM further development EDGE (Enhanced Data Services for GSM Evolution).

Each reception vector $\underline{z}$ is described statistically by its probability density as follows:

$$P\{z_n | \underline{c}\} = \frac{1}{2\pi\sigma^2 M} \exp \frac{-\sum_{\mu=1}^{M} \left| z_\mu - \sum_{l=0}^{L} c_{\mu-l} h_l \right|^2}{2\pi\sigma^2} \qquad (5)$$

From formula (5), it is possible to derive $P\{\underline{z}_n|c_n\}$ for the individual symbols of the reception vector $\underline{c}$.

The sign of $q(c_n)$ corresponds to the likeliest information content of $c_n$, and the absolute value of q is a measure of the reliability of this information content.

In order to generate this reliability information $q(c_n)$, the channel model shown in FIG. 2 is represented by a corresponding trellis diagram which describes the behavior of the channel in the form of state transitions. In this case, the trellis specifies the new state for each instantaneous state of the channel in dependence on a new symbol $c_m$. A trellis state at the instant $\mu$ subsequently is designated by $S_\mu$ and is defined by $S_\mu=(c_{\mu-L+1}, \ldots, c_\mu)$.

Each state change $S_{\mu-1} \rightarrow S_\mu$ can be allocated a metric increment which is then evaluated later for assessing the probability of this state change and is defined by the following formula:

$$\lambda(S_{\mu-1}, S_\mu) = \left| z_\mu - \sum_{l=0}^{L} c_{\mu-l} h_l \right|^2 / \sigma^2 \qquad (6)$$

The logarithmic determination of the soft decision information according to equation (1) has the advantage that the state metrics which are output by the MAP algorithm can be adopted without transformations.

Using this metric formula (6), the trellis corresponding to the channel 6 shown in FIG. 2 can now be evaluated in order to calculate corresponding probabilities for each state $S_\mu$ for each trellis or time step $\mu$. In this case, the procedure ideally passes through the trellis both in the reverse direction and in the forward direction. The text below will explain in more detail the algorithm for processing a reception word $\underline{z}$, as is described for example as "Maximum Likelihood Sequence Estimation" algorithm (MLSE) thoroughly in "Optimum And Sub-Optimum Detection Of Coded Data Disturbed By Time-Varying Intersymbol Interference", Wolfgang Koch and Alfred Baier, 1990 IEEE.

When passing through the trellis in the reverse direction, a reverse metric $\Lambda_b(S_\mu)$ can be calculated for each trellis step $\mu$ from $\mu=M$ to $\mu=L$ and for each trellis state $S_\mu$, using the following recursion:

$$\Lambda_b(S_{\mu-1}) = -\ln\{\exp(-\Lambda_b(S'_\mu) - \lambda(S_{\mu-1}, S'_\mu)) + \exp(-\Lambda_b(S''_\mu) - \lambda(S_{\mu-1}, S''_\mu))\} \qquad (7)$$

The two states $S'_\mu$ and $S''_\mu$ are defined by the state $S_{\mu-1}$ given the presence of the state value $c_\mu=+1$ and $c_\mu=-1$, respectively.

In an analogous manner, a forward metric $\Lambda_f(S_\mu)$ can be calculated for each trellis state $S_\mu$ using the following recursion:

$$\Lambda_f(S_\mu) = -\ln\{\exp(-\Lambda_f(S'_{\mu-1}) - \lambda(S'_{\mu-1}, S_\mu)) + \exp(-\Lambda_f(S''_{\mu-1}) - \lambda(S''_{\mu-1}, S_\mu))\} \qquad (8)$$

In this case, the two states $S'_{\mu-1}$ and $S''_{\mu-1}$ are defined by the state $S_\mu$ given the presence of the state value $C_{\mu-L}=+1$ and $c_{\mu-L}=-1$, respectively.

For each state transition $S_{\mu-1} \rightarrow S_\mu$ of the trellis, the metrics $\Lambda_f(S_{\mu-1})$, $\lambda(S_{\mu-1}, S_\mu)$ and $\Lambda_b(S_\mu)$ can now be added and their inverse exponentials can be added together separately for $c_{\mu-L}=-1$ and $c_{\mu-L}=+1$ over all of the states $S_\mu$;

$$u(c_{\mu-L}) = -\ln\left\{\sum_{S_\mu} \exp(-\Lambda_f(S_{\mu-1}) - \lambda(S_{\mu-1}, S_\mu) - \Lambda_b(S_\mu))\right\} \qquad (9)$$

Finally, using the expression represented in formula (9), a soft decision value $q(c_{\mu-L})$ can be calculated for the bit $c_{\mu-L}$ at the instant $\mu$ by relating to the values for $c_{\mu-L}=+1$ and $c_{\mu-L}=-1$ to one another that are calculated using formula (9);

$$q(c_{\mu-L}) = u(c_{\mu-L}=+1) - u(c_{\mu-L}=-1) \qquad (10)$$

Figure 3A:
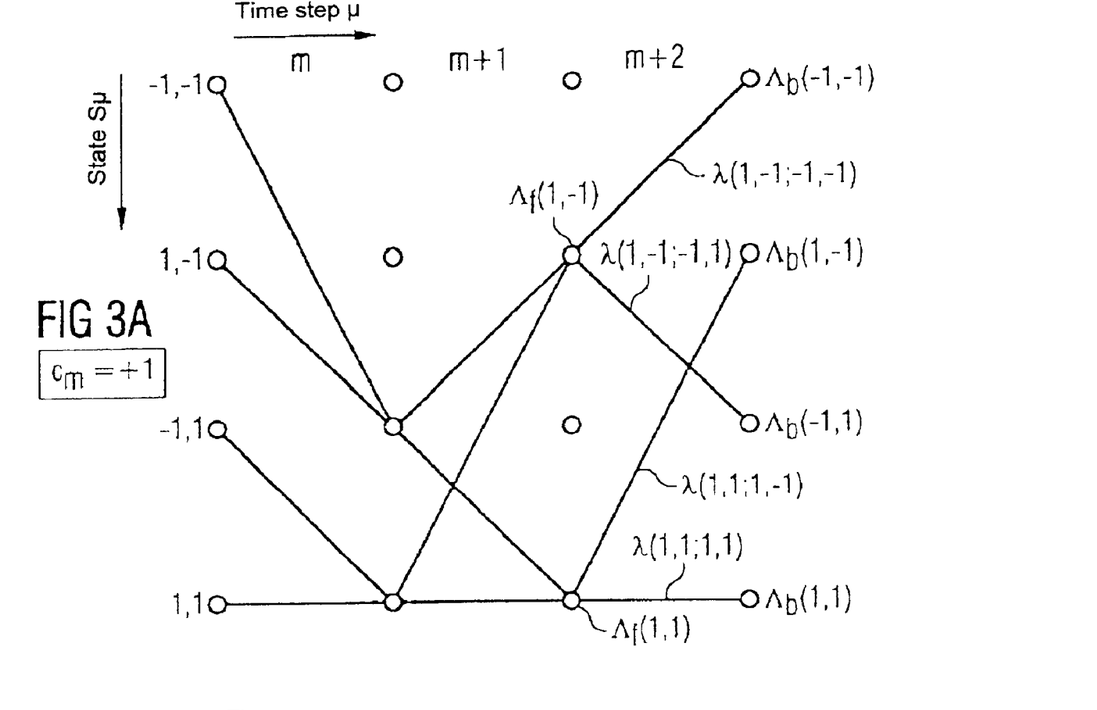
FIGS. 3A and 3B show illustrations for elucidating the metric calculation in a trellis diagram.
Figure 3B:
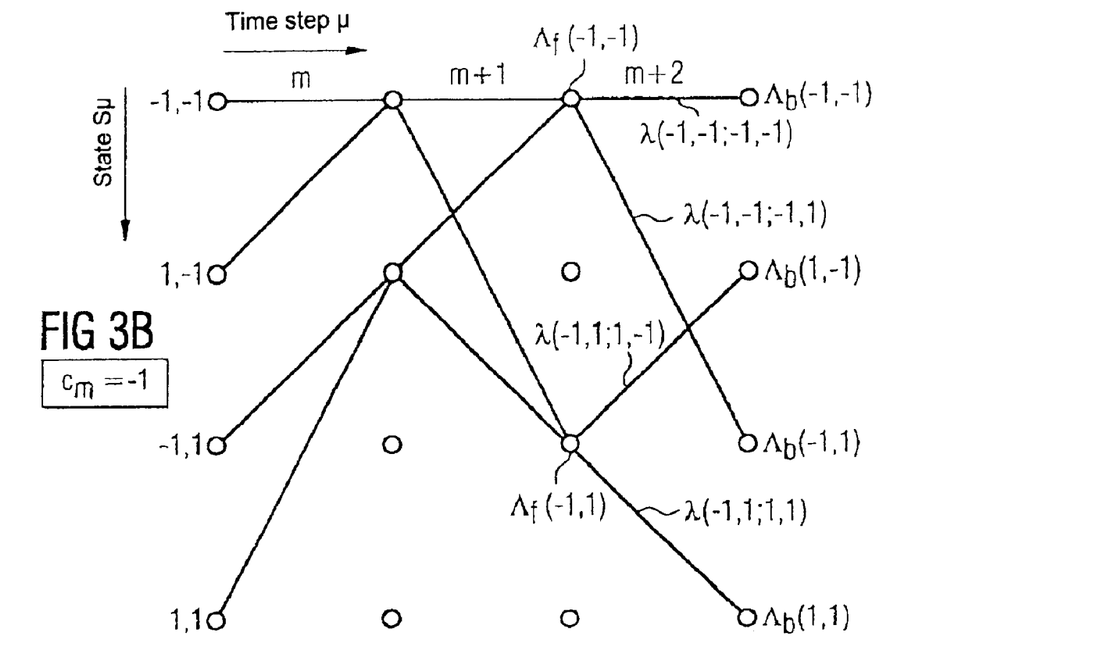

In order to clarify the above formula (9), FIG. 3A illustrates a detail from the trellis assigned to the channel model shown in FIG. 2 for L=2 and $c_m=+1$, while FIG. 3B shows the case for $c_m=-1$. FIGS. 3A and 3B only illustrate those paths of the trellis which contribute to the sum of the formula (9) in this example. Furthermore, the metrics $\Lambda_f(S_{\mu-1})$, $\lambda(S_{\mu-1}, S_\mu)$ and $\Lambda_b(S_\mu)$ are in each case entered in FIGS. 3A and 3B.

Since optimal soft decision values can be obtained as reliability information using the procedure described above, this algorithm is referred to as "Optimum Soft Decision Equalization Algorithm (OSDE)" in "Optimum And Sub-Optimum Detection of Coded Data Disturbed by Time-Varying Intersymbol Interference", Wolfgang Koch and Alfred Baier, 1990 IEEE.

However, since this algorithm requires a great deal of storage space and high computational complexity, there is a need for a simplified algorithm whose complexity, on the one hand, is significantly reduced and which, on the other hand, nevertheless supplies reliability information that is as accurate as possible.

In this respect, it is first proposed in "Optimum And Sub-Optimum Detection Of Coded Data Disturbed By Time-Varying Intersymbol Interference", Wolfgang Koch and Alfred Baier, 1990 IEEE, to simplify the exponential calculations in the formula (9). The formula (9) generally contains an expression of the form $-\ln(e^{-x}+e^{-y})$ where the following relationship holds true, however, for such expressions:

$$-\ln(e^{-x}+e^{-y}) = \min(x,y) - \ln(1+e^{-|y-x|}) \qquad (11)$$

For $x \ll y$ and $x \gg y$, the expression $-\ln(e^{-x}+e^{-y})$ can thus be approximated with negligible error by forming the minimal value $\min(x,y)$. A further simplification can be achieved if passing through the trellis in the reverse direction is dispensed with and the metrics $\Lambda_b(S_\mu)$ in the formula (9) are thus set to 0 for all of the states $S_\mu$.

The calculation of the reliability information at the instant $\mu$ for the instant $\mu-L$ in accordance with formula (10) is thus simplified as follows:

$$q(c_{\mu-L}) = \min_{S_\mu | c_{\mu-L}=+1} (\Lambda_f(S_{\mu-1}) + \lambda(S_{\mu-1}, S_\mu)) - \min_{S_\mu | c_{\mu-L}=-1} (\Lambda_f(S_{\mu-1}) + \lambda(S_{\mu-1}, S_\mu)) \qquad (12)$$

The essential difference from the traditional Viterbi algorithm is thus merely that only the selection of two minimum values from a set of $2^L$ metrics is required for calculating the soft decision values $q(c_{\mu-L})$. This sub-optimum algorithm is therefore referred to as "Soft Decision Viterbi Equalizer (SDVE)" in "Optimum And Sub-Optimum Detection Of Coded Data Disturbed By Time-Varying Intersymbol Interference", Wolfgang Koch and Alfred Baier, 1990 IEEE.

It can be seen from formula (12), in particular, that, in accordance with this sub-optimum algorithm, the soft decision value $q(c_{\mu-L})$ depends, on the one hand, on the path with the best path metric at the instant $\mu-L$ for the value +1 ("Maximum One Path", MOP) and, on the other hand, on the path with the best path metric at the instant $\mu-L$ for the value -1 (or 0) ("Maximum Zero Path", MZP).

Since the determination of the soft decision information $q(c_n)$ has been described above, the estimation—proposed according to the invention—of the bit error rate (BER) in dependence on the soft decision information will be discussed in more detail below.

As is shown in FIG. 1, the receiver 7 has a bit error rate estimator 15, which receives the soft decision information or reliability information $q(c_n)$ determined by the equalizer 8 and generates, depending on the information, estimation information p regarding the bit or symbol error rate.

The soft decision information $q(c_n)$ according to formula (1) or (4) is quantized into K classes or levels, i.e. the following mapping holds true $$q(c_n) \mapsto q_k \quad \text{with } k=0 \ldots K-1 \qquad (13)$$

For each of these K classes, a class error rate $p_k$ can be calculated according to formula (1) or (4), the following holding true for all symbols of the class k:

$$q_k = \ln \frac{P\{c_n = +1\}}{P\{c_n = -1\}} = \ln \frac{1 - p_k}{p_k} \quad (14)$$

In formula (14), $q_k$ denotes the symbol error rate of the class k where $p_k = P\{c_n = -1\}$ (and thus $P\{c_n = +1\} = 1 - p_k$).

Accordingly, there follows from formula (14) for the symbol error rate $p_k$ of a class $$p_k = \frac{1}{1 + \exp(q_k)} \quad (15)$$

The estimation information p regarding the symbol error rate of a complete burst can then be calculated from the individual class error rates $p_k$ by the bit error rate estimator 15 shown in FIG. 1 as follows, where $n_k$ denotes the number of estimated symbols in the respective class k:

$$p = \frac{\sum_{k=0}^{K-1} (n_k p_k)}{\sum_{k=0}^{K-1} n_k} \quad (16)$$

Consequently, in accordance with formula (16), in order to calculate p, the sum of all the symbol error rates of the burst is divided by the number of symbols of the burst.

The estimation of the bit error rate can be simplified if it is assumed that the soft decision information $q(c_n)$ is obtained by the sub-optimum algorithm explained above. Because:

$$q(c_n) = \ln P \frac{\{z_n \mid c_n = +1\}}{P\{z_n \mid c_n = -1\}} \quad (17)$$

$$= \ln(P\{z_n \mid c_n = +1\}) - \ln(P\{z_n \mid c_n = -1\})$$

the following approximations can be made in this respect by comparison with formula (12):

$$2\sigma^2 \ln(P\{z_n \mid c_n = +1\}) \approx MOP \quad (18)$$

$$2\sigma^2 \ln(P\{z_n \mid c_n = -1\}) \approx MZP \quad (19)$$

As has already been mentioned, MOP denotes the path metric—calculated in the context of the sub-optimum algorithm described above—for the best path of the trellis diagram which has the value +1 at the instant $\mu - L$, while MSP denotes the path metric for the best path of the trellis diagram which has the value $-1$ at the instant $\mu - L$ (cf. formula (12)).

Proceeding from the approximations in accordance with formulas (18) and (19), the soft decision information $q(c_n)$ of the equalizer 8 can thus be expressed to an approximation in correspondence with formula (1) as follows:

$$q(c_n) = C \frac{MOP - MZP}{2\sigma^2} \quad (20)$$

In this case, C denotes a scaling constant. The soft decision information approximated in this way can be subdivided, i.e. quantized, into a plurality of classes in the manner described above, eight classes (K =8) typically sufficing for binary data transmissions. In accordance with formula (15), the corresponding class error rate $p_k$ can then be calculated from $q_k$ for each class. The bit error rate p of the complete burst follows from the individual class error rates $p_k$ in accordance with formula (16).

The following thus results for the bit error estimation of a typical GSM burst with 116 symbols and K=8:

$$p = \frac{\sum_{k=0}^{7} (n_k p_k)}{116} \quad (21)$$

Figure 5:
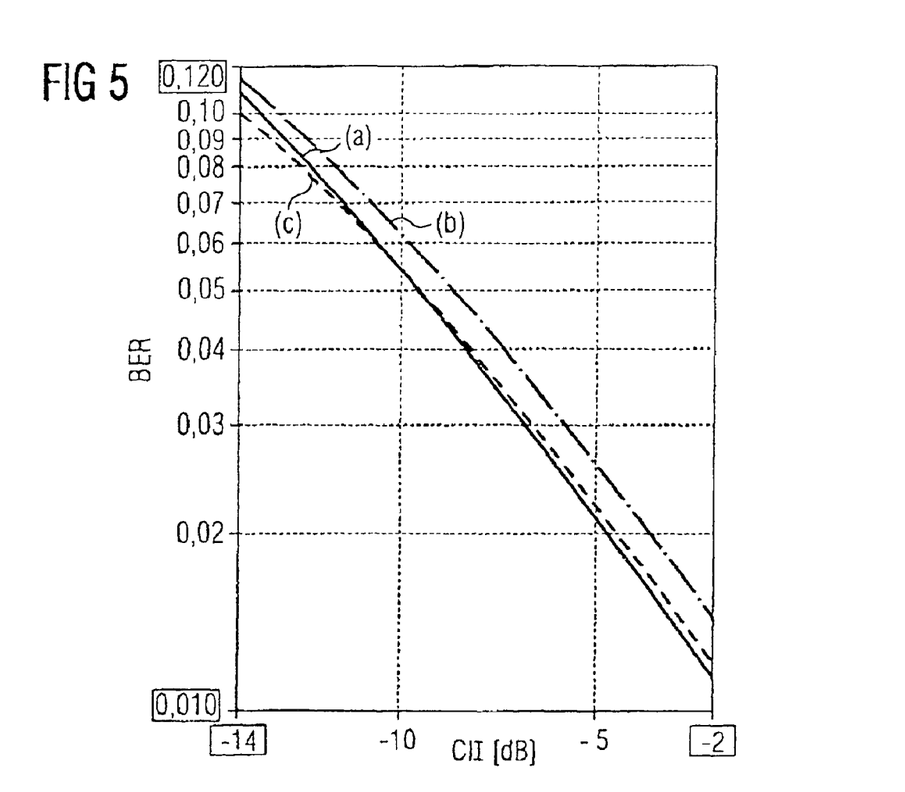
FIG. 5 is a graph of the bit error rate plotted against the C/I ratio, where it can be seen that the bit error rate can be estimated quite well using the present invention.

The above-described approach for estimating the bit error rate using the values MOP and MZP has already been tested by simulations. The simulation results are illustrated in FIG. 5. In FIG. 5, the bit error rate (BER) has been plotted against the C/I ratio (ratio of the respective carrier signal to adjacent-channel interference) and it has been assumed that the reception signal is a TU50 signal and the adjacent-channel interference involves TU50 adjacent channels. In FIG. 5, the characteristic curve (a) corresponds to the profile of the bit error rate measured under these conditions, while the characteristic curves (b) and (c) correspond to the profile of the bit error rate estimated using the above method for C=1.1 and C=1.3, respectively. It can be seen from FIG. 5 that the actual bit error rate can be estimated relatively well using this approximated estimation method.

The bit error rate estimation described above can, of course, also be applied to multivalue symbol alphabets.

We claim:

1. A method for estimating the bit error rate in a radio receiver, which comprises:

with an equalizer in a radio receiver, generating reliability information indicating probabilities that a data symbol received by the radio receiver via a radio channel is based on a specific transmitted value;

generating the reliability information as soft decision information;

with a bit error rate estimator, evaluating the reliability information to obtain bit error rate information regarding a bit error rate of a received signal corresponding to received data symbols; and quantizing the soft decision information into K quantization levels, determining a symbol error rate information item for a corresponding quantization level of each quantized soft decision information item, and dependent thereon, calculating the bit error rate information p for a complete burst in accordance with a formula:

$$p = \frac{\sum_{k=0}^{K-1} (n_k p_k)}{\sum_{k=0}^{K-1} n_k}$$

where K denotes a number of the quantization levels, $n_k$ denotes a number of estimated symbols in a quantization level k, and $p_k$ denotes a symbol error rate of the quantization level k.

2. The method according to claim 1, which comprises:
calculating the symbol error rate $p_k$ of the quantization level k from quantized soft decision information $q_k$ of the quantization level k in accordance with a formula:

$$p_k = \frac{1}{1+\exp(q_k)}.$$

3. The method according to claim 2, which comprises:
determining the soft decision information q in accordance with a formula:

$$q = \ln\frac{P1}{P2}$$

where P1 indicates a probability that a received data symbol is based on a first transmitted value, and P2 indicates a probability that a received data symbol is based on a second transmitted value;
approximating the probability P1 by a path metric of a first path of a trellis diagram that describes the radio channel, the first path being a path of the trellis diagram that has a first transmitted value with a best path metric at a specific instant; and
approximating the probability P2 by a path metric of a second path of the trellis diagram, the second path being a path of the trellis diagram that has a second transmitted value with a best path metric at the specific instant.

4. The method according to claim 1, which comprises:
determining the soft decision information q in accordance with a formula:

$$q = \ln\frac{P1}{P2}$$

where P1 indicates a probability that a received data symbol is based on a first transmitted value, and P2 indicates a probability that a received data symbol is based on a second transmitted value;
approximating the probability P1 by a path metric of a first path of a trellis diagram that describes the radio channel, the first path being a path of the trellis diagram that has a first transmitted value with a best path metric at a specific instant; and
approximating the probability P2 by a path metric of a second path of the trellis diagram, the second path being a path of the trellis diagram that has a second transmitted value with a best path metric at the specific instant.

5. The method according to claim 4, which comprises:
approximating $\ln(P1)$ by $MOP/2\sigma^2$ and approximating $\ln(P2)$ by $MZP/2\sigma^2$, where MOP denotes the path metric of the first path of the trellis diagram and MZP denotes the path metric of the second path of the trellis diagram, and $\sigma^2$ denotes a noise power that is superposed on the received signal along the radio channel.

6. The method according to claim 5, which comprises:
approximating the soft decision information q using a formula:

$$q = C\frac{MOP-MZP}{2\sigma^2}$$

where C represents a scaling constant; and
subsequently quantizing the soft decision information q into the K quantization levels.

7. A radio receiver, comprising:
an equalizer for equalizing a radio signal received via a radio channel and for generating reliability information indicating probabilities that a received data symbol is based on a specific transmitted value; and
a bit error rate estimator for evaluating the reliability information supplied by said equalizer to obtain bit error rate information p regarding a bit error rate of a received signal corresponding to received data symbols;
said equalizer generating the reliability information as soft decision information; and
said bit error rate estimator quantizing the soft decision information into a plurality of quantization levels, determining a symbol error rate information item for a corresponding quantization level from each quantized soft decision information item, and in a manner dependent thereon, calculating the bit error rate information p for a complete burst in accordance with a formula:

$$p = \frac{\sum_{k=0}^{K-1} n_k p_k}{\sum_{k=0}^{K-1} n_k}$$

where K denotes a number of the quantization levels, $n_k$ denotes a number of estimated symbols in a quantization level k, and $p_k$ denotes a symbol error rate of the quantization level k.

8. The radio receiver according to claim 7, comprising:
a deinterleaver;
said bit error rate estimator connected between said equalizer and said deinterleaver.

9. The radio receiver according to claim 7, wherein said bit error rate estimator is configured for:
calculating the symbol error rate $p_k$ of the quantization level k from quantized soft decision information $q_k$ of the quantization level k in accordance with a formula:

$$p_k = \frac{1}{1+\exp(q_k)}.$$

10. The radio receiver according to claim 7, wherein said bit error rate estimator is configured for:
determining the soft decision information q in accordance with a formula:

$$q = \ln\frac{P1}{P2}$$

where P1 indicates a probability that a received data symbol is based on a first transmitted value, and P2 indicates a probability that a received data symbol is based on a second transmitted value;

approximating the probability P1 by a path metric of a first path of a trellis diagram that describes the radio channel, the first path being a path of the trellis diagram that has a first transmitted value with a best path metric at a specific instant; and approximating the probability P2 by a path metric of a second path of the trellis diagram, the second path being a path of the trellis diagram that has a second transmitted value with a best path metric at the specific instant.

11. The radio receiver according to claim 7, wherein said bit error rate estimator is configured for:

approximating ln(P1) by MOP/2$\sigma^2$ and approximating ln(P2) by MZP/2$\sigma^2$, where MOP denotes the path metric of the first path of the trellis diagram and MZP denotes the path metric of the second path of the trellis diagram, and $\sigma^2$ denotes a noise power that is superposed on the received signal along the radio channel.

12. The radio receiver according to claim 7, wherein said bit error rate estimator is configured for:

approximating the soft decision information q using a formula:

$$q = C\frac{MOP - MZP}{2\sigma^2}$$

where C represents a scaling constant; and subsequently quantizing the soft decision information q into the K quantization levels.

* * * * *